(12) United States Patent
Izume

(10) Patent No.: US 11,772,564 B2
(45) Date of Patent: Oct. 3, 2023

(54) SLIDE TYPE LID STRUCTURE

(71) Applicant: NIFCO INC., Yokosuka (JP)

(72) Inventor: Tomoharu Izume, Yokosuka (JP)

(73) Assignee: NIFCO INC., Yokosuka (JP)

( * ) Notice: Subject to any disclaimer, the term of this patent is extended or adjusted under 35 U.S.C. 154(b) by 570 days.

(21) Appl. No.: 17/055,741

(22) PCT Filed: Apr. 24, 2019

(86) PCT No.: PCT/JP2019/017434
§ 371 (c)(1),
(2) Date: Nov. 16, 2020

(87) PCT Pub. No.: WO2019/220898
PCT Pub. Date: Nov. 21, 2019

(65) Prior Publication Data
US 2021/0206322 A1    Jul. 8, 2021

(30) Foreign Application Priority Data

May 16, 2018   (JP) .................. 2018-094901

(51) Int. Cl.
*B60R 7/04*    (2006.01)
*B60R 11/00*   (2006.01)
(Continued)

(52) U.S. Cl.
CPC ............ *B60R 7/04* (2013.01); *B65D 43/20* (2013.01); *E05B 83/32* (2013.01); *B60R 2011/0007* (2013.01); *B60R 2011/0094* (2013.01)

(58) Field of Classification Search
CPC ............ B60R 7/04; B60R 2011/0007; B60R 2011/0094; E05B 83/32; B65D 43/20
See application file for complete search history.

(56) References Cited

U.S. PATENT DOCUMENTS 5,884,799 A     3/1999   Körber et al.
8,579,348 B1 *  11/2013  Myers .................. B60R 7/04
                                              296/24.34
(Continued)

FOREIGN PATENT DOCUMENTS

JP    H09-193952 A    7/1997
JP    2002-293192 A   10/2002
(Continued)

OTHER PUBLICATIONS

Europe Patent Office, "Search Report for European Patent Application No. 19803032.2," dated Oct. 8, 2021.
(Continued)

*Primary Examiner* — Gregory A Blankenship
(74) *Attorney, Agent, or Firm* — Manabu Kanesaka

(57) ABSTRACT

A sliding lid structure includes a sheet base material capable of being curved in a sliding direction; and a plurality of ribs disposed on a lower surface side of the sheet base material at intervals in a sheet base material sliding direction. Two ends of the rib engage guide grooves formed at two sides of an opening of a device main unit and having curved groove parts. The sheet base material includes axially supported parts positioned on two sides of the lower surface side of the base material and provided at predetermined intervals in a longitudinal direction. The rib includes rib uppers arranged inside the axially supported parts on the two sides and attachable to and detachable from a sheet base material lower, shaft supports engaging the axially supported parts, and projections fitting into the guide grooves; and is rotatably or swingably supported with respect to the sheet base material.

8 Claims, 13 Drawing Sheets

(51) Int. Cl.
 *B65D 43/20* (2006.01)
 *E05B 83/32* (2014.01)

(56) References Cited

U.S. PATENT DOCUMENTS

| | | | | |
|---|---|---|---|---|
| 8,726,971 | B2* | 5/2014 | Sato | B60R 7/04 |
| | | | | 160/231.2 |
| 10,857,946 | B2 | 12/2020 | Taniguchi et al. | |
| 2003/0052129 | A1* | 3/2003 | Fukuo | B60N 3/102 |
| | | | | 220/350 |
| 2007/0045366 | A1* | 3/2007 | Kato | B60R 7/04 |
| | | | | 224/312 |
| 2010/0045060 | A1* | 2/2010 | Hipshier | B60N 2/793 |
| | | | | 296/1.08 |
| 2012/0024857 | A1* | 2/2012 | Kodama | A45C 13/16 |
| | | | | 220/350 |
| 2015/0151661 | A1 | 6/2015 | Morel et al. | |
| 2018/0002977 | A1* | 1/2018 | Luber | E06B 9/115 |
| 2018/0093601 | A1* | 4/2018 | Sotelo | B60N 3/108 |
| 2018/0118121 | A1* | 5/2018 | Gorman, Jr. | B60R 7/04 |
| 2018/0334850 | A1* | 11/2018 | Bastian | E06B 9/08 |
| 2019/0039535 | A1* | 2/2019 | Boinais | B60N 2/793 |
| 2019/0135153 | A1* | 5/2019 | Kim | B60R 7/04 |
| 2021/0094475 | A1* | 4/2021 | Hopfen | B60R 7/04 |
| 2021/0206322 | A1* | 7/2021 | Izume | B65D 43/20 |
| 2022/0274530 | A1* | 9/2022 | Thomas | B60N 2/793 |

FOREIGN PATENT DOCUMENTS

| | | |
|---|---|---|
| JP | 2006-291510 A | 10/2006 |
| JP | 2012-250570 A | 12/2012 |
| JP | 2013-204256 A | 10/2013 |
| WO | 2017/043579 A1 | 3/2017 |
| WO | 2017/145732 A1 | 8/2017 |

OTHER PUBLICATIONS

PCT/ISA/210, "International Search Report for International Application No. PCT/JP2019/017434," dated Jul. 9, 2019.

* cited by examiner

W2>W1
S2<S1

W3>W2
S3<S2

SLIDE TYPE LID STRUCTURE

TECHNICAL FIELD

The present invention relates to a slide type lid structure.

BACKGROUND ART

FIGS. 12(a) and 12(b) are figures disclosed in Patent Document 1. According to this lid structure, an opening 12 of a device main unit 11 is opened and closed by a main shutter 16 corresponding to the sheet base material according to the prevent invention and a bendable secondary shutter 22. Thus, the main unit 11 is provided with a main guide groove 32 composed of a main linear groove part 33 and a main curved groove part 34, and a secondary guide groove 36 composed of a secondary linear groove part 37 and a secondary curved groove part 38. An interval between the main linear groove part 33 and the secondary linear groove part 37 is made narrow, and an interval between the secondary curved groove part 34 and the secondary curved groove part 38 is made wide. Furthermore, the main shutter 16 is formed by bendably linking a plurality of ribs (shutter constituent members) 17 to a cloth tape 21. The secondary shutter 22 is composed of a soft part 23 with an outer skin 24 on an outside thereof, and an inner sheet 25. Furthermore, according to this lid structure, when the opening 12 is closed by the main shutter 16 and the secondary shutter 22, the main shutter (hereinafter, the sheet base material) 16 pushes the secondary shutter (hereinafter, the exterior sheet) 22 up.

FIGS. 13(a) and 13(b) are figures disclosed in Patent Document 2. This lid 10 is formed of a cushioning sheet 14 that can be displaced to curve in a sliding direction, a decorative film 16 adhered to the cushioning sheet 14, and a plurality of rods 12 that are integrated into the cushioning sheet 14 during molding and distributed at intervals in a sliding direction. Furthermore, when left and right ends of the rods 12 are fitted into a guide groove provided on a box not illustrated in the figures, which has a curved groove part on a part thereof, the lid 10 slides to open and close an opening in the box. The lid structure described above makes damage such as cracking and whitening, and the like, caused by local loading, which causes appearance deterioration, unlikely to occur by interposing the cushioning sheet 14 between the rods 12 and the decorative film 16 so as to fit into the curved groove part and thus preventing localized folding and bending. Note that, relative to the present invention, the rods 12 correspond to the ribs and the cushioning sheet 14 corresponds to the sheet base material.

PRIOR ART DOCUMENTS

Patent Document 1: Japanese Unexamined Patent Application Publication No. 2013-204256.
Patent Document 2: Japanese Unexamined Patent Application Publication No. H09-193952.

OUTLINE OF THE INVENTION

Problem to be Solved by the Invention

Since the exterior sheet and the sheet base material are separate entities in the lid structure according to Patent Document 1 described above, long-term use creates a gap between the exterior sheet and the sheet base material when the lid is closed, which could become loose when the exterior sheet is touched. Furthermore, since an exterior sheet and a sheet base material slide in two independent guide grooves as a lid structure, there is a restriction in the space and shape for forming the guide grooves, which reduces design freedom, and makes it difficult to regulate the aforementioned becoming loose, and the like.

With the lid structure of Patent Document 2 described above, a pattern on the decorative film may gradually become distorted and unattractive after long-term use. The main cause is that even if the curved groove part of the guide groove makes localized loading to receive as difficult as possible, a welded part or a joint part of the rib on the cushioning sheet will be difficult to bend since spaces between the ribs will bend more to compensate, such that if there is a heat creep deformation in, for example, a bent state, the deformation will lead to surface uneven and make the degree of deformation noticeable. If the thickness dimension of the cushioning sheet is set, in other words, if the sheet is made thicker as a countermeasure, operating force will rise during sliding. If the sheet is made thinner, a bending line will be made visible by a local load received by the curved groove part of the guide groove, which will spoil the appearance.

Thus, an object of the present invention is to provide a slide type lid structure that is able to, for example, maintain good appearing characteristics, remove a risk of sticking even if a sheet base material is made thin, and that will increase a degree of freedom for designing a guide groove. Other objects will be made clear in the following descriptions.

Means for Solving the Problem

To achieve the object described above, the present invention is provided with a sliding lid structure comprising a sheet base material capable of being curved in a sliding direction; and a plurality of ribs disposed on a lower surface side of the sheet base material at intervals in a sheet base material sliding direction, two ends of the rib engaging guide grooves being formed at two sides of an opening of a device main unit and having curved groove parts, and opening and closing the opening by sliding along the guide grooves. The sheet base material includes a multiplicity of axially supported parts positioned on two sides of the lower surface side of the base material and provided at predetermined intervals in a longitudinal direction, and the rib includes rib uppers arranged inside the axially supported parts on the two sides and attachable to and detachable from a sheet base material lower, shaft supports engaging the axially supported parts, and projections that fit into the guide grooves; and is rotatably or swingably supported with respect to the sheet base material centered on the shaft supports.

The present invention described above may be embodied according to the following aspects.

(1) The guide groove is configured so that a groove width of the curved groove part of the guide groove is formed wider than a groove width of an almost straight linear groove part provided in an opening area of the device main unit. According to this aspect, when the sheet base material has been slid to be closed via the ribs in a direction where a groove width of the guide groove narrows, the ribs try to stay horizontal as much as possible and, as a result, stand up to thus stably support the sheet base material by making contact with and pushing the sheet base material upward. Thus, the risk of the sheet base material described above becoming loose can be eliminated. Furthermore, when the sheet base material has been slid to open via the ribs in a direction where the groove width of the guide groove widens, the ribs swing in a falling direction and, as a result, are able to thus mitigate or minimize the occurrence of loads or broken lines, which readily occur in sheet base material. Therefore, appearance characteristics can be maintained for long periods of time.

(2) The rib upper is configured so as to be able to apply an upward load on the sheet base material when a lid is closed with the opening thereof being closed by the sheet base material and is able to release the load when the lid is open with the opening being opened. According to this aspect, because the rib upper of each rib takes on the shape of an upwardly convex loose bow, each upper, in an open state, makes contact with and raises a left to right middle part of the sheet base material, which is the part most susceptible to bending, to thus achieve an optimal support configuration.

(3) The rib upper is configured so as to take on a shape of an upwardly convex loose bow. According to this aspect, a stable movement is maintained because a rib lower ensures rigidity near the shaft support and, when the projection is fitted into the guide groove, the projection contacts with a groove guide partition wall to regulate a width direction position.

(4) The rib is configured to include a rib lower that protrudes relatively lower than the shaft support and regulates a width direction position by slidably abutting against the partition wall that partitions the guide groove when the projection is fitted into the guide groove. According to this aspect, because the rib upper and the rib lower each project in correspondence to a rotating or swinging direction centered on the rib shaft support, a contacting/separating or supporting operation and a rib lower position regulating operation can be obtained with respect to the sheet base material in optimal fashion through the rib upper swinging described above.

(5) The rib upper and the rib lower are configured to protrude in a rotating or swinging direction, respectively, centered on the support shaft of the rib. According to this aspect, good sliding characteristics are maintained because the ribs are linked and slid together via a rail guide.

(6) The rail guide is configured to slidably connect and link the ribs together. According to this aspect, the rail guide makes the projection fit more smoothly, particularly with respect to the guide groove, via a covering part, which thus improves sliding characteristics by reducing slide resistance and wobbling movement.

(7) The rail guide is configured to integrally form a multiplicity of the covering parts mounted on an outer circumference of the projection and linking parts that link the covering parts together.

Effect of the Invention

When compared to a structure that forms and fixes a rib integrally to a sheet base material, the present invention uses a process of sliding a sheet base material along a curved groove part of a guide groove, which makes it possible to bend the entire base material uniformly. This makes it possible to maintain good appearance characteristics because it suppresses the occurrence of broken lines or wrinkles after the sheet base material has been repeatedly slid open and closed via the rib. In addition to improving appearance, this point is ideal in cases for example, a plate-shaped body, such as an additional sheet, touch panel, or similar body, is to be attached to the surface of the sheet base material.

BRIEF DESCRIPTION OF THE DRAWINGS

FIGS. 1(a) and 1(b) illustrate an embodiment example of a device main unit to which the sliding lid structure according to the present invention has been applied, wherein FIG. 1(a) is a top view thereof, and FIG. 1(b) being a substantially cross-sectional view along Line A-A.

FIGS. 3(a)-3(c) illustrate the aforementioned lid, wherein FIG. 3(a) is a top view, FIG. 3(b) is a bottom view, and FIG. 3(c) is a side view thereof.

FIGS. 5(a)-5(c) illustrate a rib swinging principle that accompanies the sliding of the aforementioned lid, wherein FIG. 5(a) through FIG. 5(c) are schematic drawings illustrating swinging and rib upper contact with and separation from the sheet base material for each aspect where a projection is arranged in the guide groove, from a location where groove width is narrow as illustrated in FIG. 5(a) to a location where groove width is wide as illustrated in FIG. 5(c).

FIGS. 6(a)-6(c) illustrate the sheet base material, wherein FIG. 6(a) is a bottom view thereof, FIG. 6(b) is a side view thereof, and FIG. 6(c) is a cross-sectional view along Line C-C in FIG. 6(a).

FIGS. 7(a) and 7(b) illustrate the aforementioned rib, wherein FIG. 7(a) is a perspective view illustrating a standing state, and FIG. 7(b) is a perspective view illustrating a fallen state where the rib has been rotated clockwise from FIG. 7(a).

FIGS. 8(a)-8(c) illustrate a rail guide, wherein FIG. 8(a) is a partial perspective view, FIG. 8(b) is a top view, and FIG. 8(c) is a side view thereof.

DESCRIPTION OF THE PREFERRED EMBODIMENTS

Figure 9A:
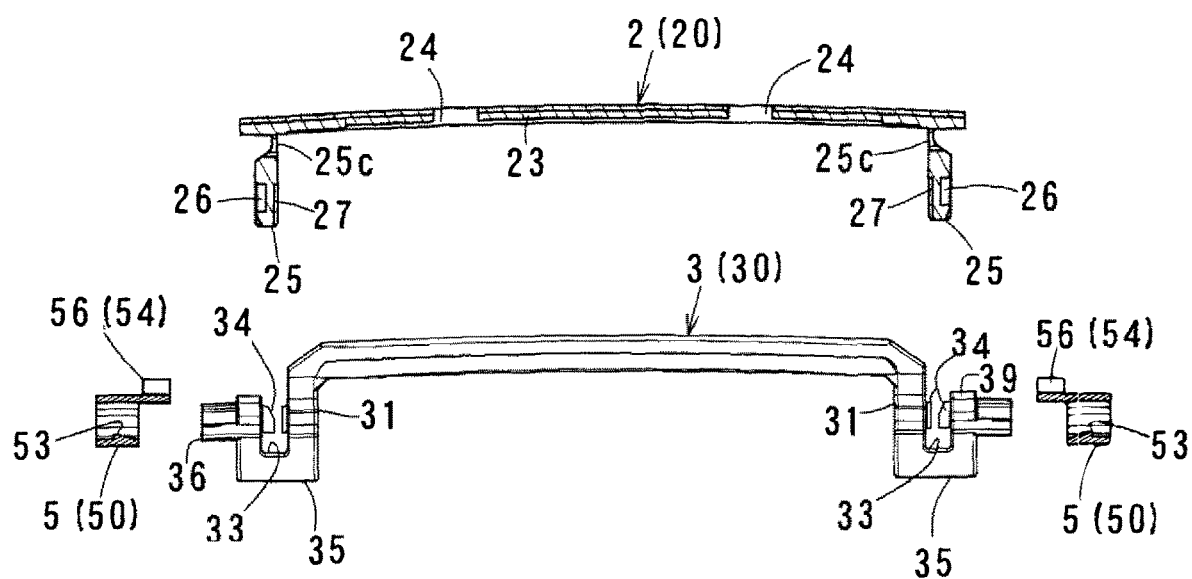
FIG. 9(a) is a perspective view illustrating the relationship between the sheet base material and the rib.
Figure 9B:
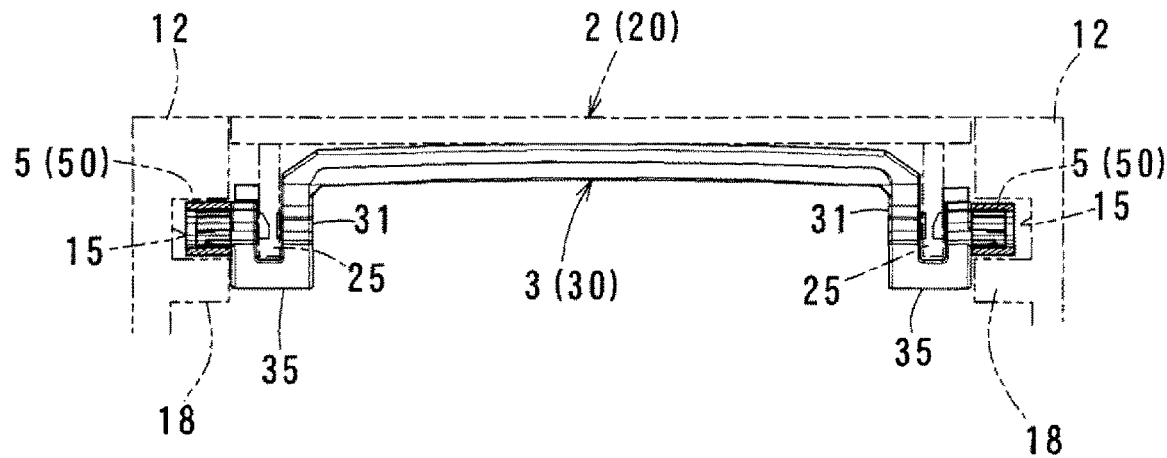
FIG. 9(b) is schematic view illustrating the relationship between the rib and the rail guide and the guide groove.
Figure 10:
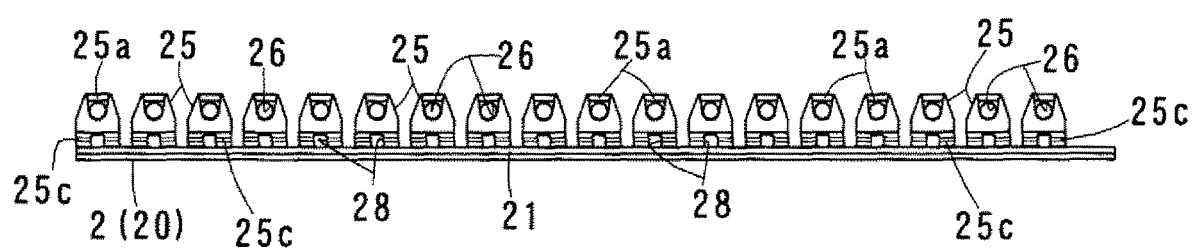
FIG. 10 is a view illustrating a state, where a Modification 1 corresponds to FIG. 6(b).
Figure 11A:
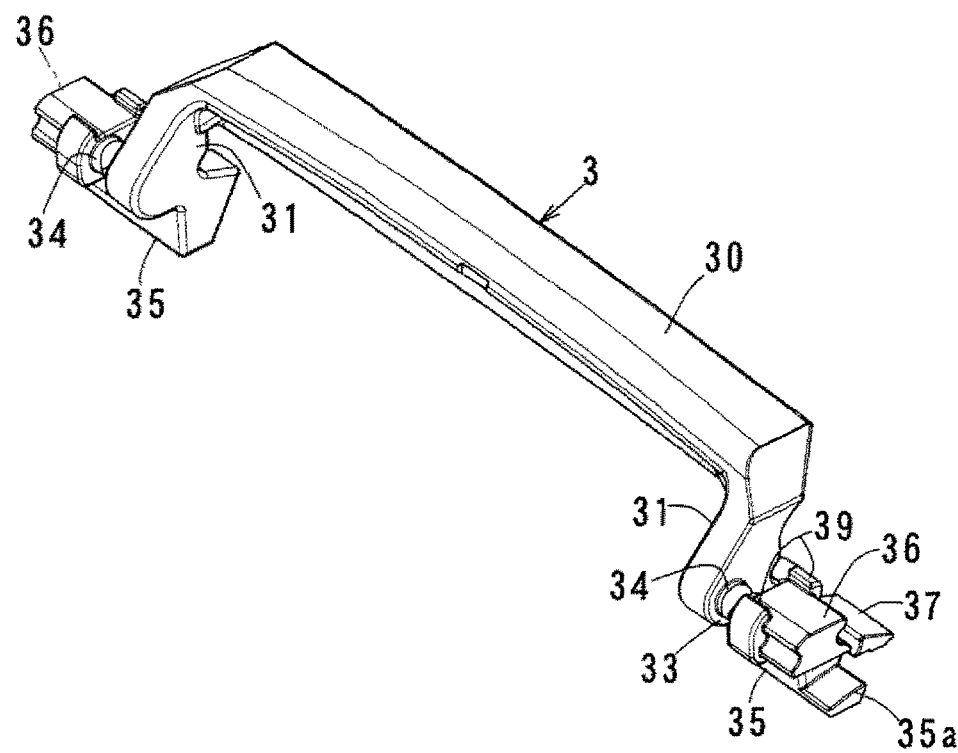
FIG. 11(a) and FIG. 11(b) are views illustrating states, where a Modification 2 corresponds to FIG. 7(a) and FIG. 9(b).
Figure 11B:
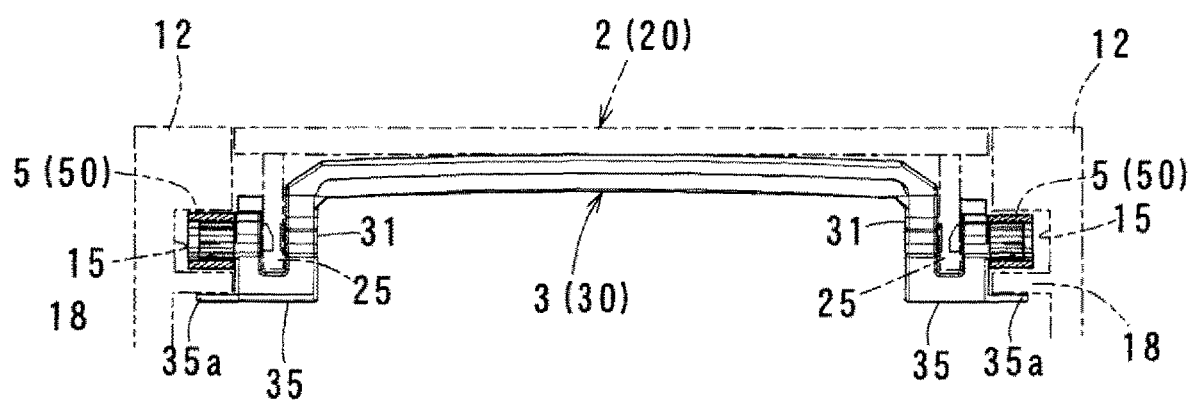
Figure 12A:
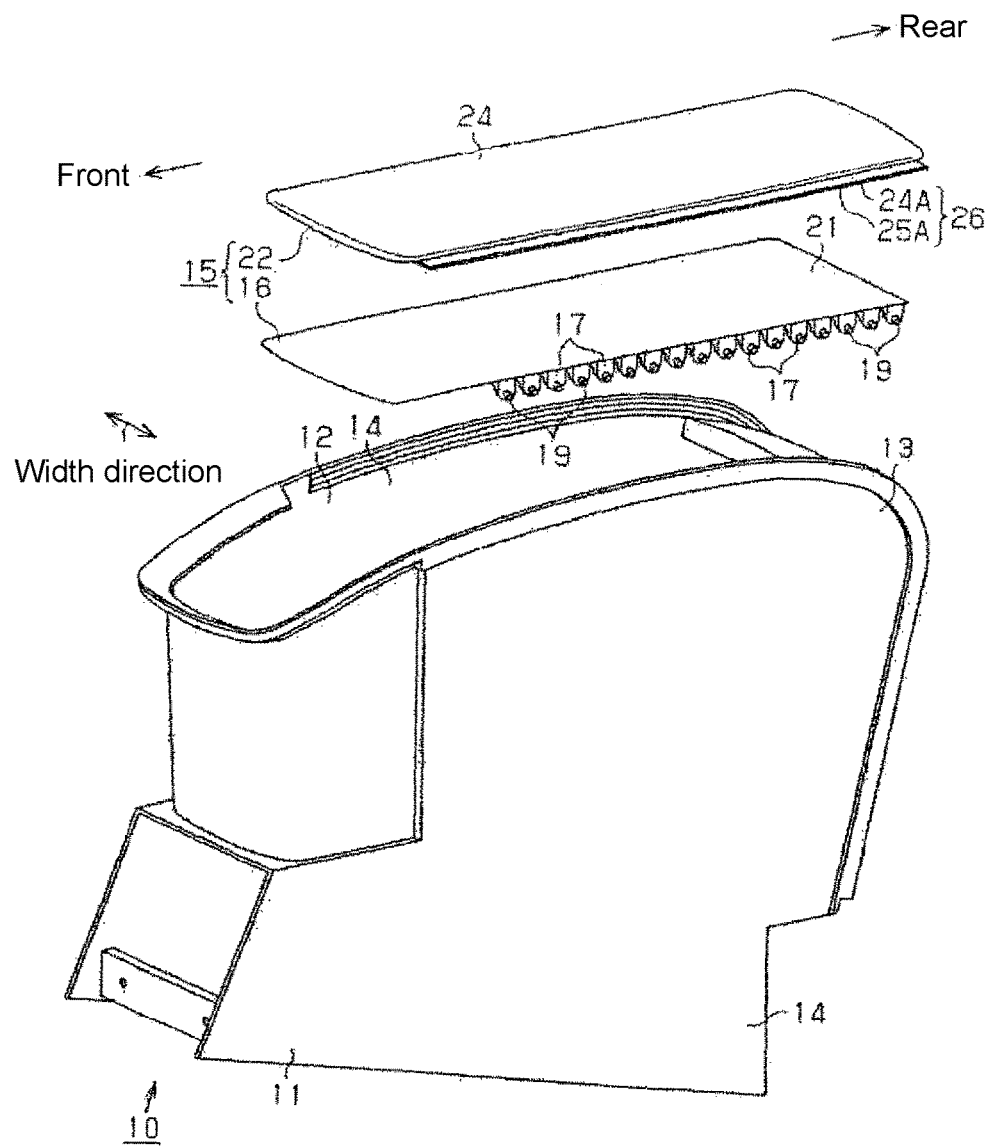
FIGS. 12(a) and 12(b) are views illustrating key parts of the lid disclosed in Patent Document 1.
Figure 12B:
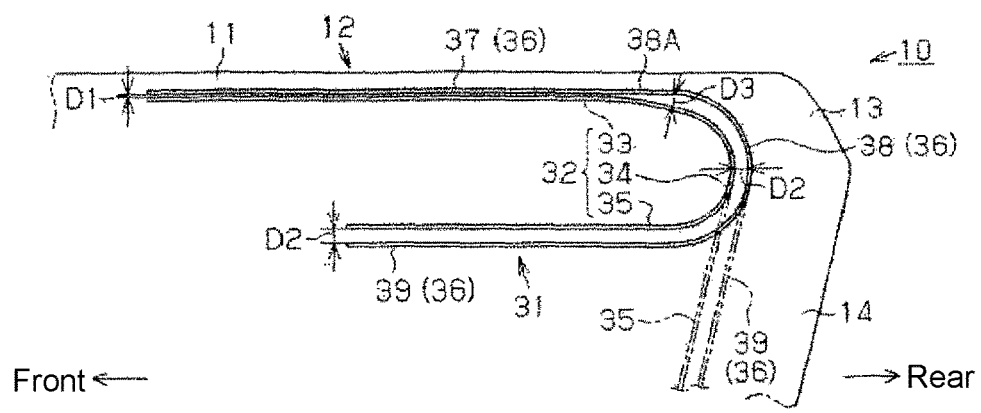
Figure 13A:
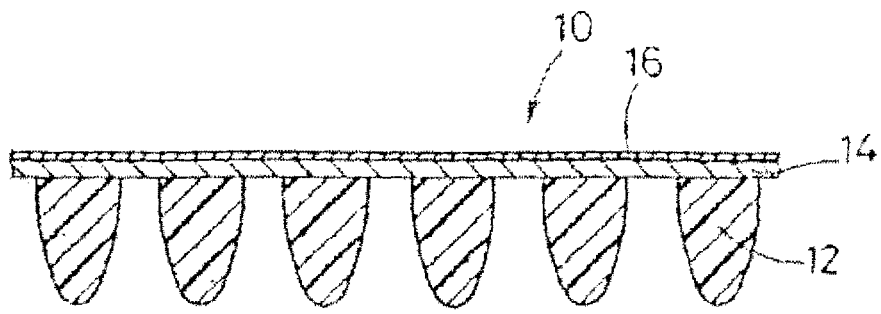
FIGS. 13(a) and 13(b) are views illustrating key parts of the lid (shutter) disclosed in Patent Document 2.
Figure 13B:
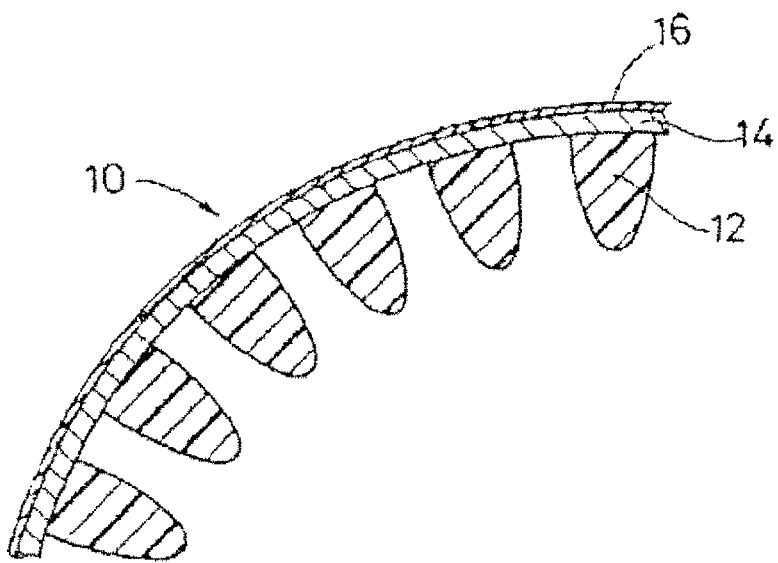

Embodiment examples according to the present invention will be described below with reference to the attached drawings. FIG. 1(a) through FIG. 9(b) illustrate embodiments according to the present invention and FIG. 10 and FIGS. 11(a) and 11(b) illustrate two modifications thereof. The following description will first clarify present embodiments of a sliding lid structure and will then explain operational characteristics and Modifications 1 and 2.

(Lid Structure)

FIGS. 1(a) and 1(b) and FIGS. 2(a) through 2(c) illustrate an entire device main unit 1 of a console box, or the like, to which the present invention has been applied. The device main unit 1 is composed of an outer case 10, an under tray 11, a side plate 12 on both sides, a center case 13, a lower tray 14, and a sliding lid 4, and is configured to open an upper opening 8 of a first housing part 9A and a second housing part 9B via the sliding lid 4.

Figure 2A:
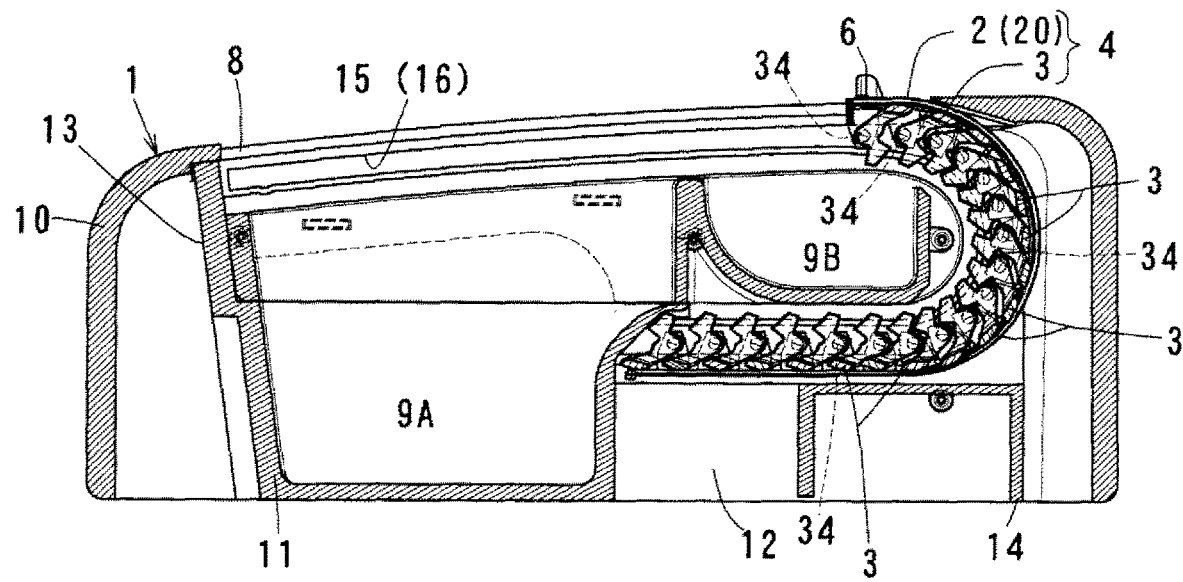
FIG. 2(a) is a cross-sectional view illustrating the opening of the lid in FIG. 1(b) from a closed state to an open state.
Figure 2B:
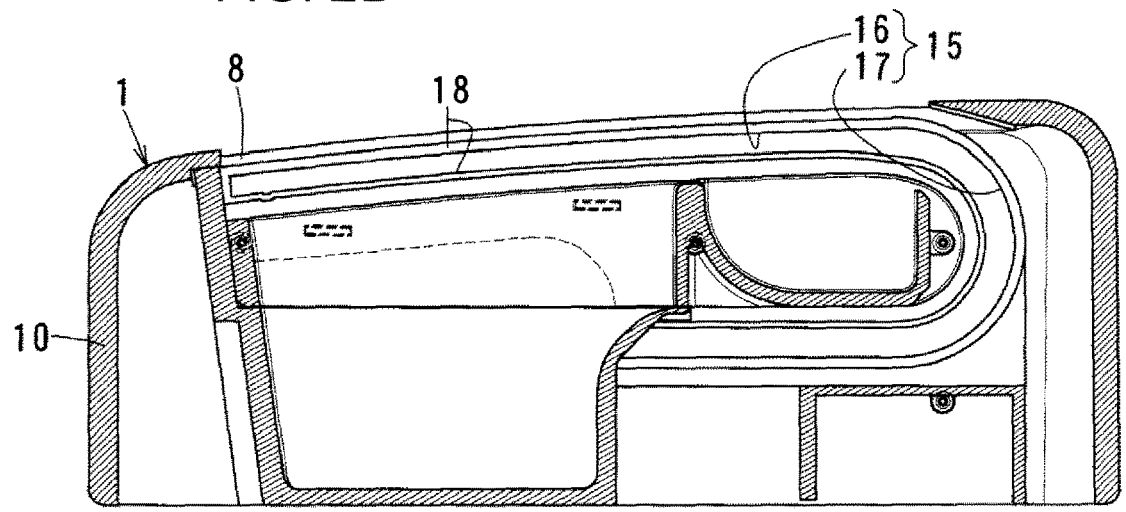
FIG. 2(b) is a cross-sectional view illustrating an aspect of the aforementioned device main unit without a lid.
Figure 2C:
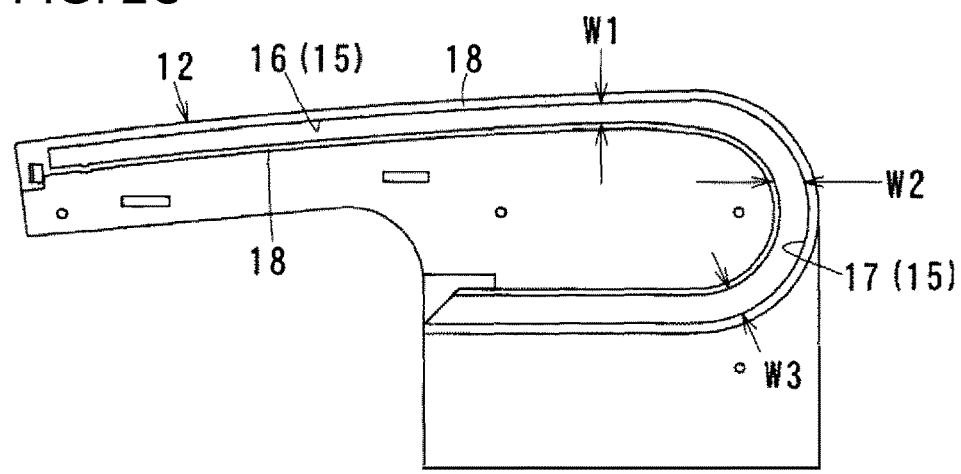
FIG. 2(c) illustrates a side plate that forms a guide groove.

Here, it is inferred from FIG. 2(c) that the side plate 12 on each side is provided with a guide groove 15 that faces an opposite surface. Each of the guide grooves 15 has approximately a concave cross section that is partitioned by a partition wall 18, or the like, and includes a linear groove part 16 that extends in a more or less linear fashion along an upper edge of the opening 8, and a curved groove part 17 that is formed in a substantially spiral or substantially arc shape downward from one side of the linear groove part 16. A groove width W1 of the linear groove part 16 is formed smaller than a groove width W2 of an upper groove of the curved groove part 17, and the groove width W2 of the upper groove of the curved groove part 17 is formed smaller than a groove width W3 of a lower groove of the curved groove part 17. In other words, a width of the guide groove 15 has a relationship where W1<W2<W3 that continuously and smoothly changes in a longitudinal direction.

The sliding lid 4 includes a sheet base material 2 that can be displaced to curve in a sliding direction and a plurality of ribs 3 positioned on a lower surface of the sheet base material 2 and distributed at intervals in the sliding direction of the sheet base material 2, and is built into the device main unit 1 when a projection 36 provided on both ends of the rib 3 is fitted into the guide groove 15 via a rail guide 5, and is a lid type that opens and closes the opening 8 by being slid along the guide groove 15.

The key points of ingenuity are that the groove widths W2 and W3 of the curved groove part 17 of the guide groove 15 are formed wider than the groove width W1 of the nearly straight linear groove part 16 provided in the area of the opening 8 in the device main unit 1; that the sheet base material 2 includes a multiplicity of legs 25 positioned on both sides of a lower side of the sheet at prescribed intervals in a longitudinal direction and axially supported parts 26 provided on the legs 25; that the rib 3 is arranged inside the axially supported parts 26 and includes a rib upper 30 that can make contact with and be separated from the lower surface of the sheet base material 2, left and right support shafts 34 rotatably or swingably fitted into both axially supported parts 26, and the projection 36 that fits into the guide groove 15; that there is a guide rail 5 that is able to slidably connect and link the ribs 3 together; and that the rib upper 30 is able to make contact with and apply an upward load on the sheet base material 2 when the lid 4 is closed, thus closing the opening 8, and is able to separate from and thus release the load from the sheet base material 2 when the lid 4 is open, thus opening the opening 8. Specific points of ingenuity of these configurations and details are explained below.

Figure 6A:
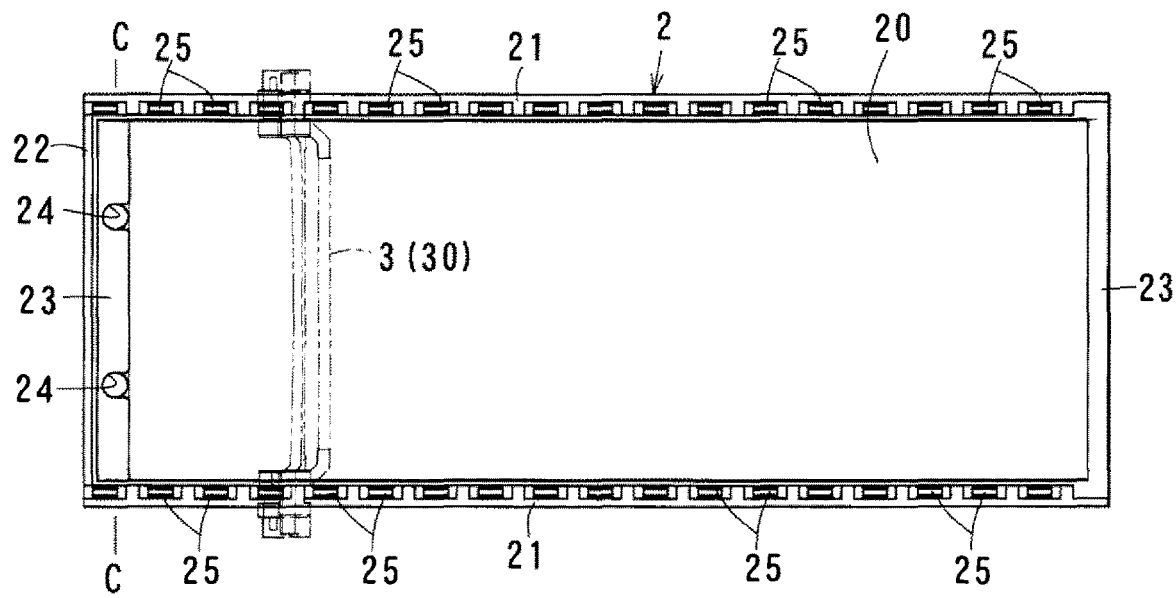
Figure 6B:
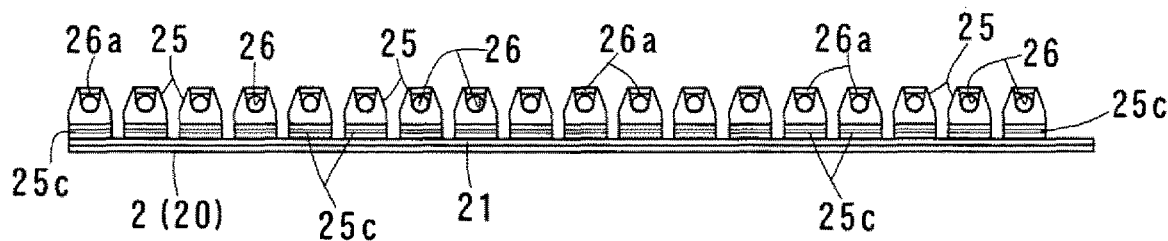
Figure 6C:
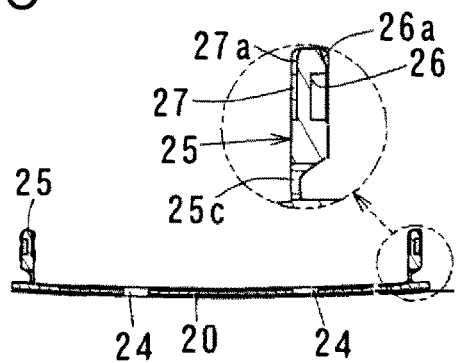

As is illustrated in FIGS. 6(a) through 6(c), the sheet base material 2 is made by a two-color molding process; a thin plate 20 is a hard resin part of an acrylonitrile-butadiene-styrene (ABS) polymer, or the like, formed by primary molding; and borders 21 and 21 on both sides of a rear surface of the thin plate 2, the multiplicity of legs 25 protruding from each of the borders 21 at prescribed intervals in a longitudinal direction, front and rear borders 23 and 23, and a front end surface wall 22 protruding from the front (on the left in FIG. 6(a)) border 23 are formed of soft resin parts such as a polyester-based elastomer or polypropylene-based elastomer formed by secondary molding.

Figure 3A:
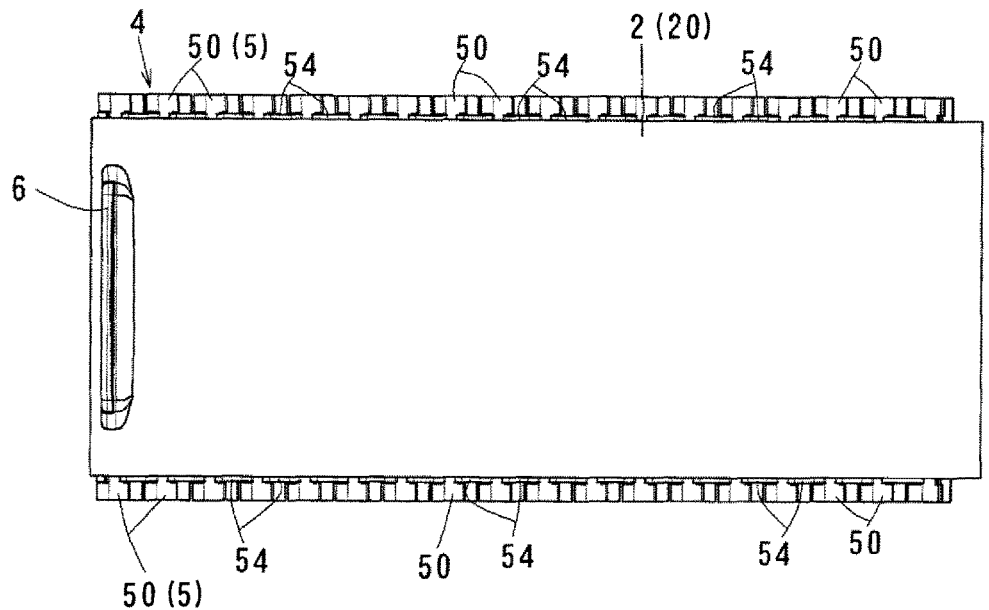
Figure 3B:
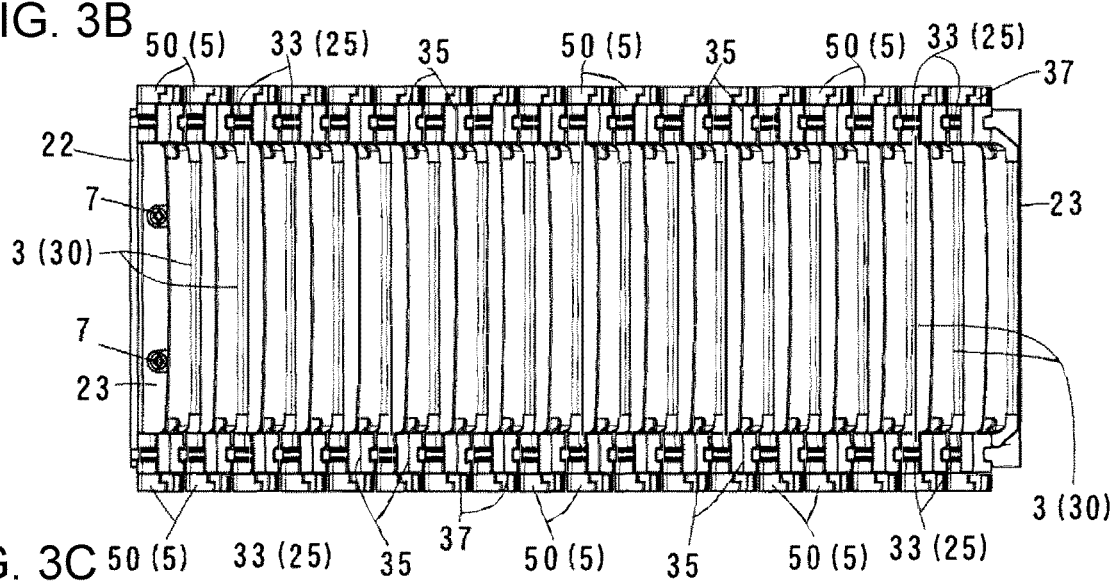
Figure 3C:
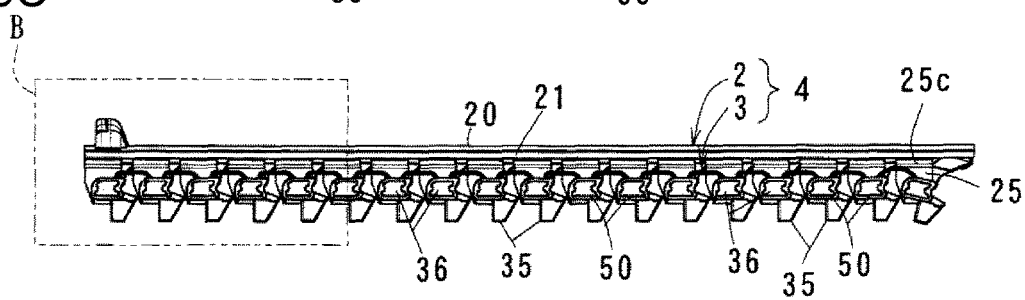
Figure 4A:
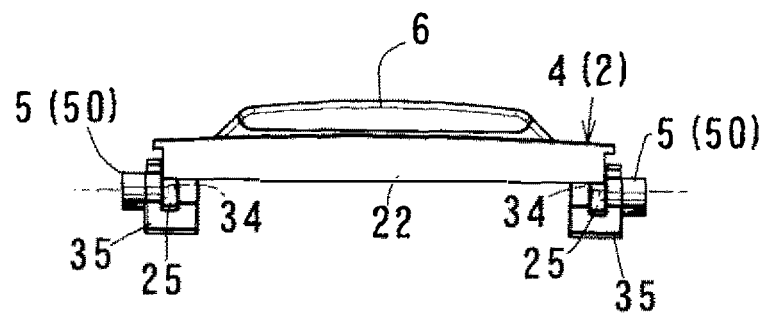
FIG. 4(a) is a left end view of the lid.
Figure 4B:
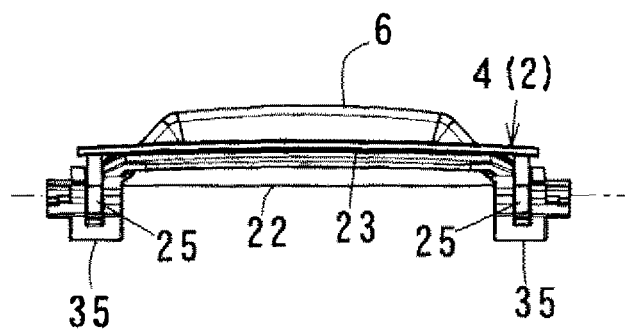
FIG. 4(b) is a right end view thereof.
Figure 4C:
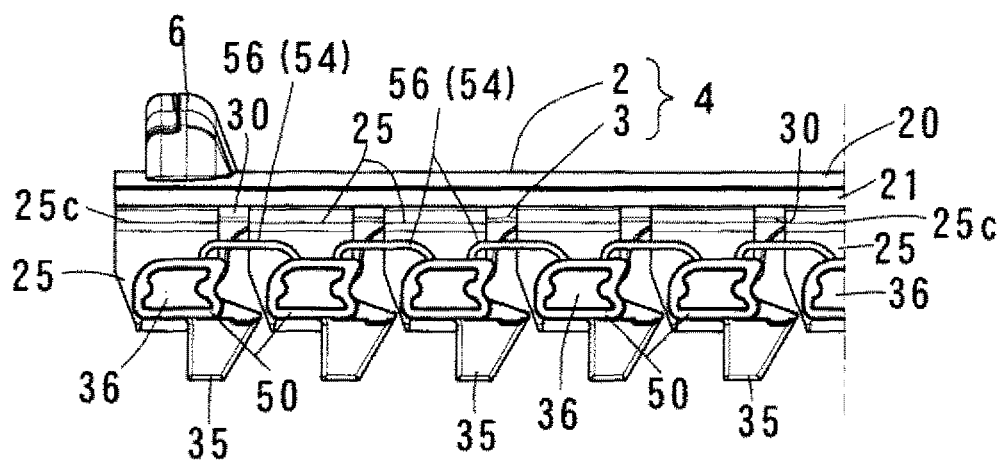
FIG. 4(c) is a magnified view of part B in FIG. 3(c).

As illustrated in FIG. 6(a), the thin plate 20 is rectangular or oblong-shaped and sized to correspond to the opening 8. Two mounting holes 24 for mounting a handle 6 are formed through the front border 23 on the front (left side of the same figure) of the thin plate 20. As illustrated in FIG. 3(a), the handle 6 is made of resin, has a substantially elongated tubular or rod-like shape, and is secured and arranged on an upper surface of the thin plate 20 by a screw 7 inserted through the mounting hole 24 from a lower side. The front-end surface wall 22 is provided integrally with parts corresponding to the legs 25 in front on both sides, which make a lower surface invisible by means of an appearance treatment on the front end of the thin plate and the closed state of the lid 4.

A multiplicity of the legs 25 is provided on both side borders 21 and 21 on the lower surface of the thin plate at prescribed intervals from a front-end surface to just before a rear end surface. As illustrated in FIG. 6(c), each of the legs 25 forms a relatively thin tongue shape and protrudes swingably above the border 21 via a thin hinge 25c. A dimension between the legs is set to an interval that prevents the legs from hitting one another when the sheet base material 2 is curved in a U shape. Each leg 25 is provided with a relatively deep concave part 26 on an outer surface and a shallow concave part 27 on an inner surface. A shallow guide groove 26a is provided between the concave part 26 and a leg end, and a shallow guide groove 27a is provided between the concave part 27 and the leg end. The concave parts 26 and 27 correspond to the axial support part according to the present invention. The shape may also be a hole shape that penetrates through the concave parts 26 and 27.

The rib 3 is formed from a thermoplastic resin with excellent wear and fatigue resistance, such as PA6 (polyamide 6 or Nylon 6), or the like, and is, overall, substantially U-shaped. Furthermore, as illustrated in FIGS. 7(a) and 7(b) and FIGS. 9(a) and 9(b), a middle of the U shape is formed into a bow-shaped rib upper 30 and each end of the U shape is formed into an L-shaped arm 31. A left to right middle portion on the rib upper 30 that protrudes the farthest comes into contact with the lower surface of the sheet base material 2.

The arm 31 includes, integrally, a rib lower 35 provided to link to an L-shaped vertical wall and a horizontal wall, a receiving groove 33 into which the leg 25 provided between the L-shaped vertical wall and an upper corresponding part of the rib lower 35 can be inserted, a shaft 34 that is a support shaft that protrudes from an inner surface of the receiving groove 33 and onto which the concave parts 26 and 27 fit, and the projection 36 protruding from an upper outer surface of the rib lower 35. Here, the rib lower 35 ensures rigidity near the shaft 34, and, as illustrated in FIGS. 9(a) and 9(b), abuts the partition wall 18 of the guide groove 15 to regulate a width direction position when the projection 36 is fitted into the guide groove 15. In sum, the rib lower sustains the stable movement of the rib 3.

Figure 7A:
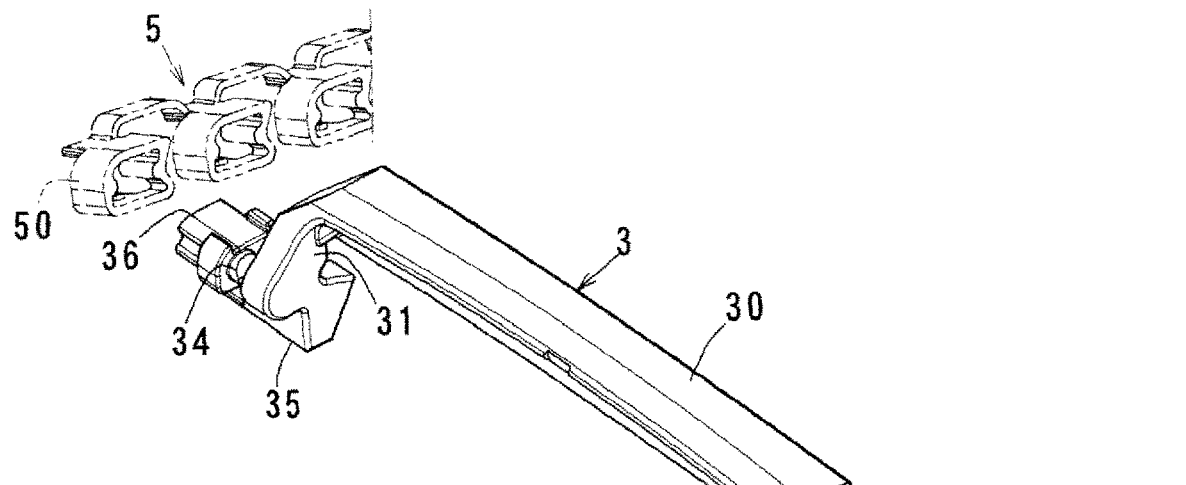
Figure 7B:
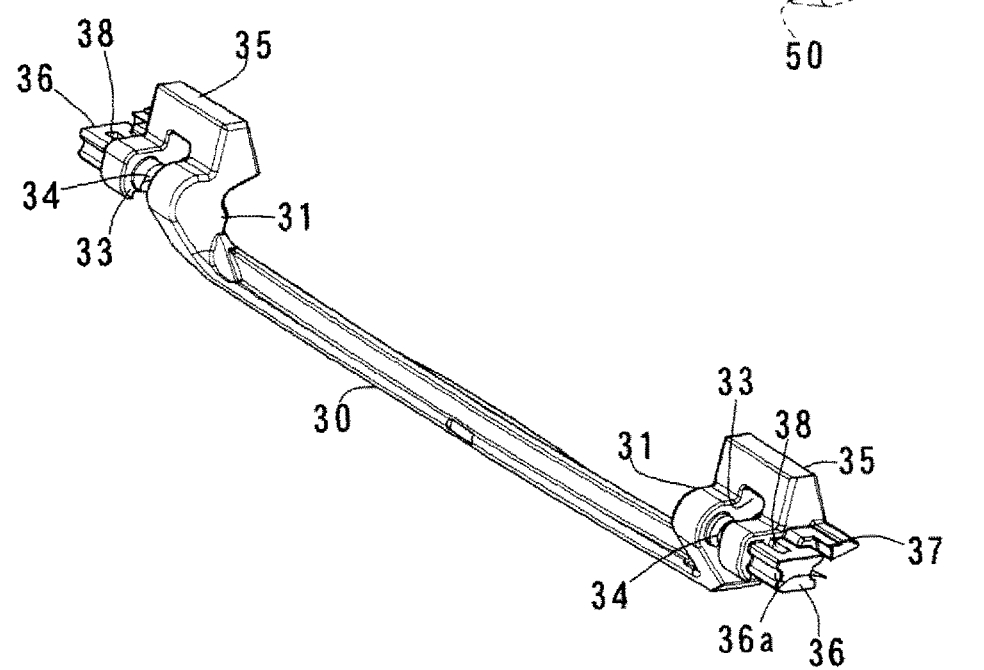

As illustrated in FIGS. 7(a) and 7(b), the projection 36 includes a concave part 36a provided on each side forming a shaft shape that fits into the guide groove 15 with room to spare, a rail guide retaining part 37 provided with a gap and linked to an outer surface of the rib lower 35, a locking hole 38 provided on a lower surface of the rib lower, and regulating convex parts 39 and 39 that protrude from an outer circumference on the receiving groove 33 side with a gap therebetween.

The same number of ribs 3 as the legs 25 are prepared in the sheet base material 2, and as illustrated in FIGS. 9(a) and 9(b), when the rib is made to correspond and is, for example, brought close to the receiving groove 33 that corresponds to the leg 25 on both sides, the rib is rotatably fitted to and assembled with the concave parts 26 and 27 and the shafts 34 and 34. When the rib 3 is standing in this assembled state, a left to right middle portion of the rib upper 30 abuts a lower surface width middle portion of the sheet base material 2, thus making it possible to support the thin plate 20 from below, that is, to apply a load upward. Furthermore, when the rib 3 is rotated or swung on the shaft 34 as a center, the rib upper 30 can be separated from the thin plate 20 to thus release the load.

Figure 8A:
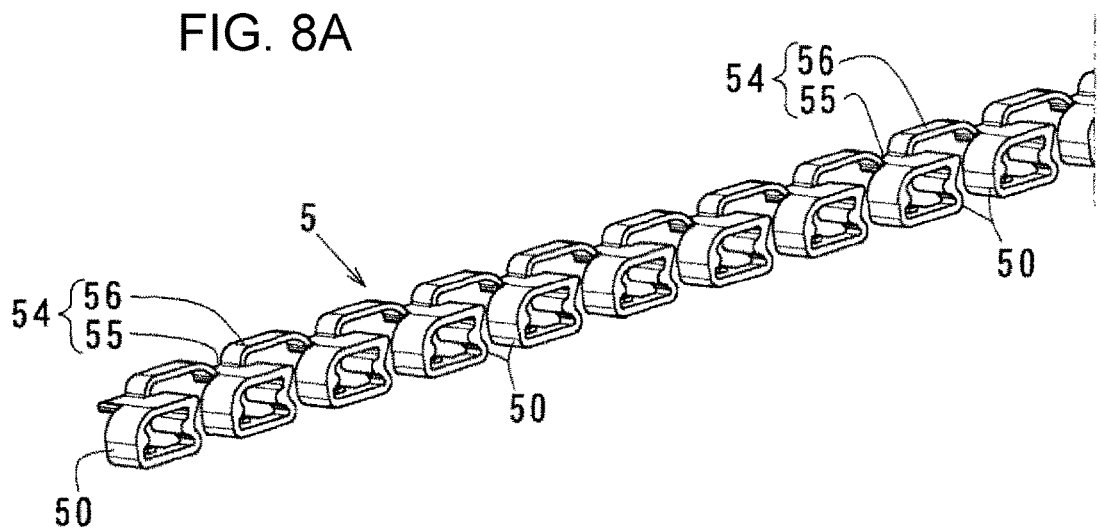
Figure 8B:
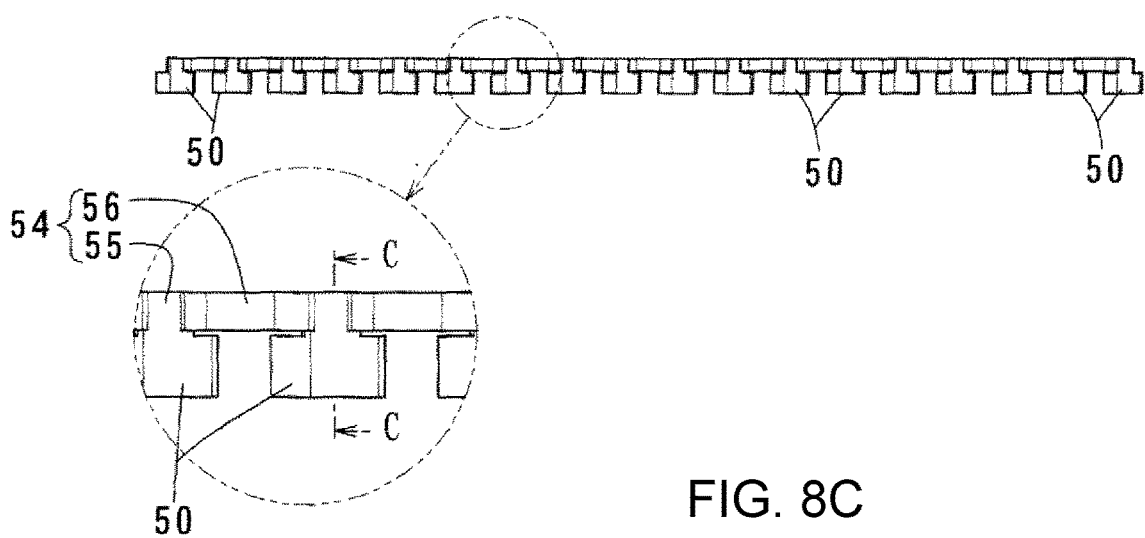
Figure 8C:
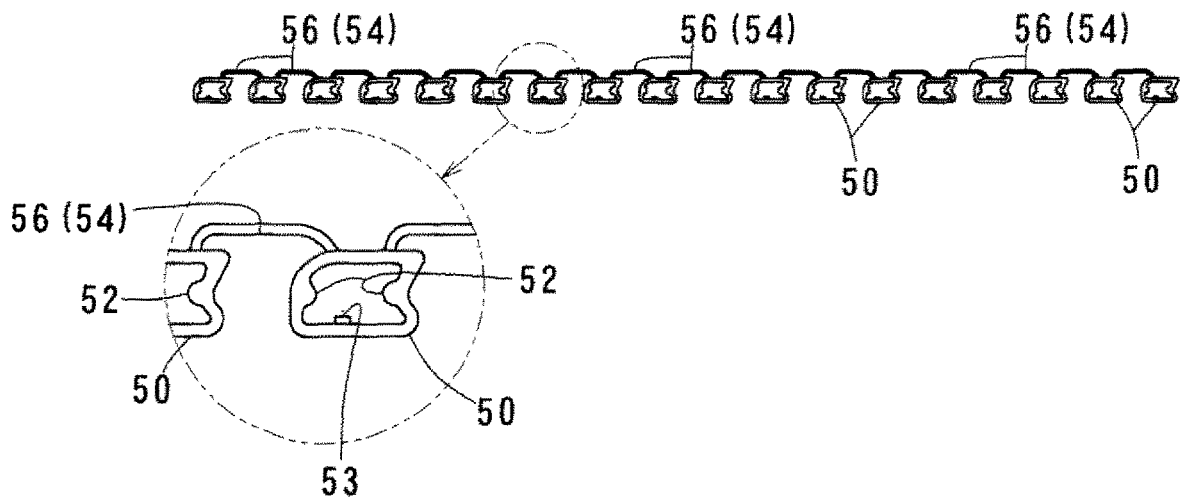

Because the rail guide 5 slidably links and interlocks the ribs 3 together, the guide is formed of a thermoplastic elastomer (TPE) that is as elastic as rubber, and the like, and, as illustrated in FIG. 8(a) through FIG. 8(c), is composed of a multiplicity of linking parts 54 that link a multiplicity of covering parts 50 with their adjacent covering parts 50. The number of covering parts 50 provided is the same as the number of ribs 3 used. Each of the covering parts 50 forms a cylindrical shape into which the projection 36 is inserted, and includes a convex part 52 formed inside the cylinder that engages the concave part 36a fits, and a hook 53 that engages the locking hole 38. The linking part 54 is composed of a neck 55 that protrudes to flush with an upper back surface side of the covering part 50, and a connecting part 56 that connects the necks 55 adjacent covering parts 50 together.

When the covering part 50 facing each rib 3 on both sides assembled to the sheet base material 2 is made to cover the projection 36, the rail guide 5 described above becomes securely attached by the engagement between the concave part 36a and the convex part 52, the engagement between the hook 53 and the locking hole 38, and by being sandwiched between the projection 36 and the retaining part 37. Furthermore, in this attached state, the neck 55 is fitted between regulating convex parts 39 to thus position and regulate the rail guide 5. Moreover, the connecting part 56 is arranged between the projections 36 on the adjacent ribs 3, that is, between adjacent regulating convex parts 39.

(Operation)

Figure 1A:
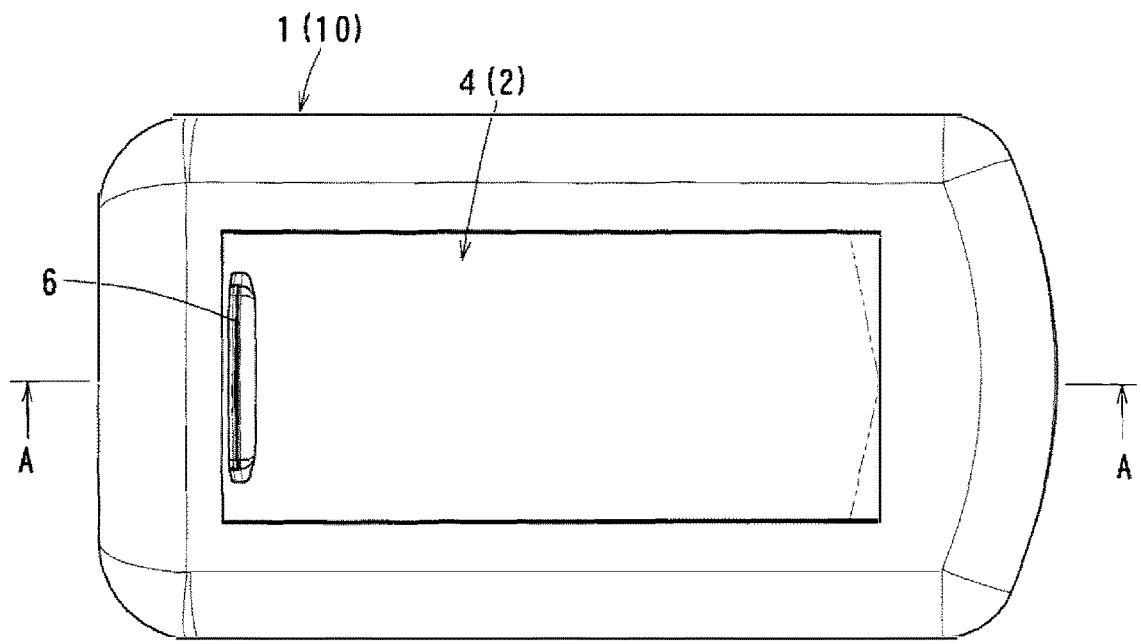
Figure 1B:
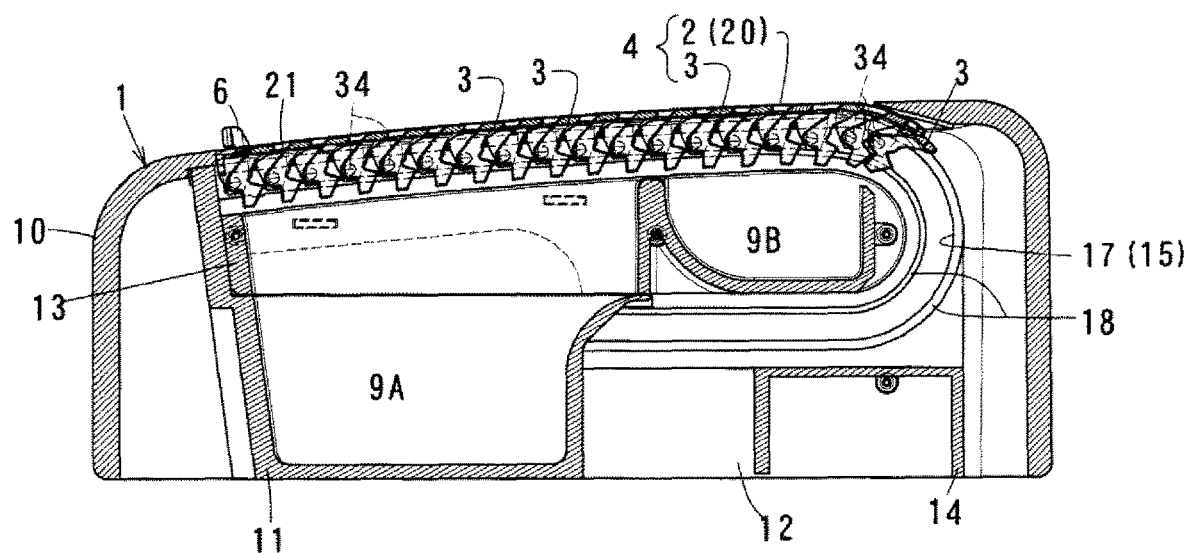
Figure 5A:
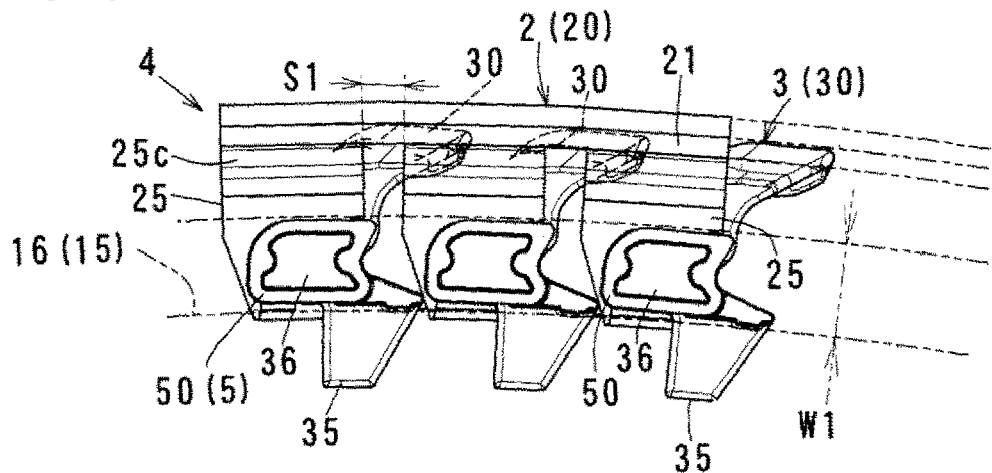
Figure 5B:
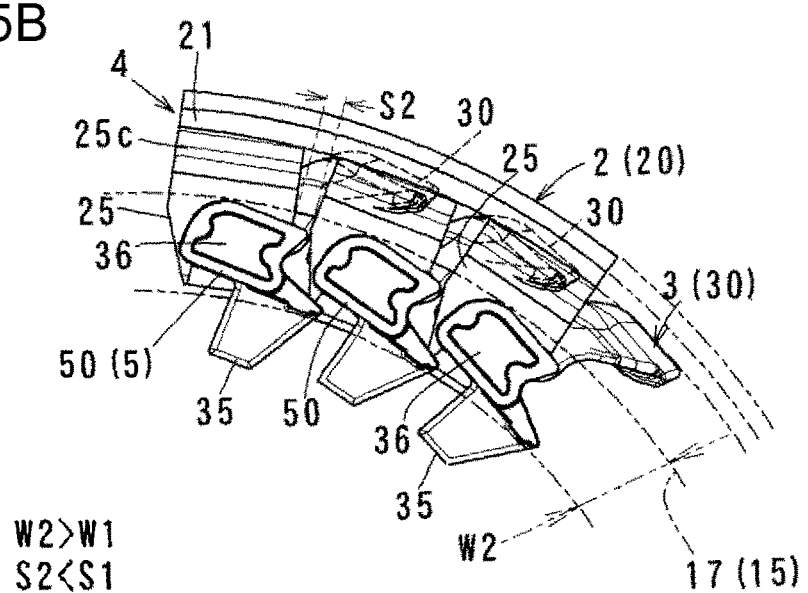
Figure 5C:
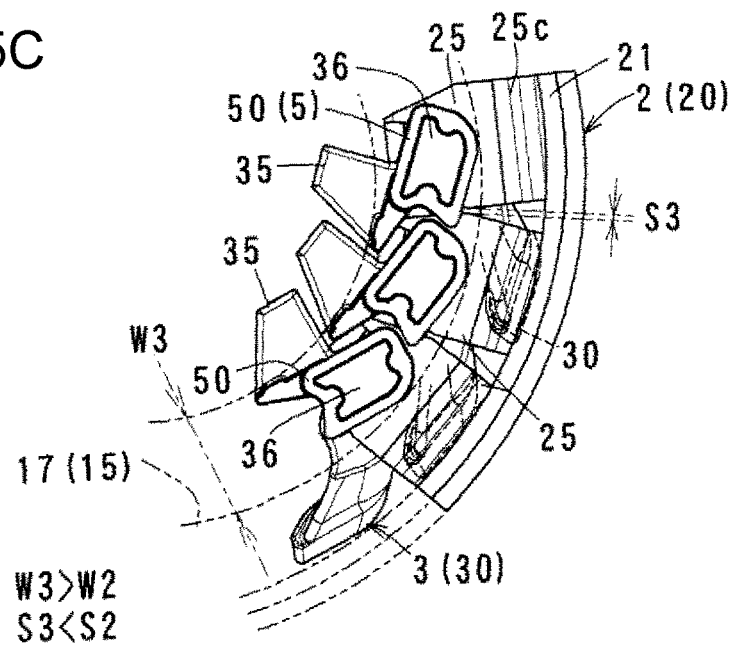

The sliding lid 4 described above is assembled in a state where the projections 36 are fitted into the guide grooves 15 of the device main unit through the covering parts 50, and is, for example, slid in the opening direction in FIG. 2(a) from the closed state in FIGS. 1(a) and 1(b) where the opening 8 of the device main unit is closed, that is, from the linear groove part 16 to the curved groove part 17 of the guide groove, using the handle 6. FIG. 5(a) to FIG. 5(c) schematically illustrate a relationship between the ribs 3 and the sheet base material 2, that is, a rib 3 swinging principle, and the benefits thereof, that accompanies the sliding of the lid 4 in a process that slides the lid 4 in an opening direction from a closed state or slides the lid in a closing direction from an open state.

(A) FIG. 5(a) illustrates a location where three of the ribs 3 of the lid 4 or the sheet base material 2 are fitted into the linear groove part 16. Note that the groove width W1 of the linear groove part 16 is narrower than the groove widths W2 and W3 of the curved groove part 17. Because each of the projections 36 is fitted into the linear groove part 16 having a relatively narrow width W through the covering 50 in this state, each of the ribs 3, as illustrated in the same figure, stays standing, and, as illustrated in FIG. 9(b), the left to right middle part of the rib upper 30 is thus in contact with the lower surface of the thin plate 20 of the sheet base material. Therefore, in this area, the rib upper 30 is pushing upwardly on, and thus stably supporting the sheet base material 2 from below. Thus, this lid structure eliminates the risk of sheet base material becoming loose described above, which has been a conventional problem. When the rib 3 is standing, an interval S1 between the adjacent legs 25, as illustrated in FIG. 6(b), is about the same dimension as in when the sheet base material 2 was formed.

(B) FIG. 5(b) illustrates a location where three of the ribs 3 of the lid 4 or the sheet base material 2 are fitted into an upper groove portion of the curved groove part 17. Note that the width W2 of the upper groove portion is wider than the groove width W1 of the linear groove part 16. Furthermore, in this state, the sheet base material 2 is curved and displaced corresponding to the upper groove portion of the curved groove part 17, and as a result, an upper side of an interval between adjacent legs 25 has widened and a lower side thereof has narrowed. An interval S2 is the maximum dimension thereof, and S2<S1. In this state, each rib 3 is swung in a falling direction by a process where each projection 36 is slid in the direction of the groove width W2, which is wider than the groove width W1 of the linear groove part 16, and as a result, it is able to thus mitigate or minimize the occurrence of loads or broken lines, which readily occur in the sheet base material 2.

(C) FIG. 5(c) illustrates a location where three of the ribs 3 of the lid 4 or the sheet base material 2 are fitted into a lower groove portion of the curved groove part 17. Note that the groove width W3 of the lower groove portion is wider than the groove width W2 of the upper groove portion in FIG. 5(b). Furthermore, in this state, the sheet base material 2 is curved and displaced corresponding to the lower groove portion of the curved groove part 17, and as a result, an upper side of an interval between adjacent legs 25 has widened more than in FIG. 5(b), and a lower side thereof has narrowed even more than in FIG. 5(b). An interval S3 is the maximum dimension thereof, and S3<S2. In this state, each rib 3 is swung even further in a falling direction by a process where each projection 36 is slid in the direction of the groove width W3, which is wider than the groove width W2 described above, and as a result, it is able to thus more reliably suppress the occurrence of loads or broken lines, which readily occur in the sheet base material 2. Thus, appearance characteristics can be maintained by this lid structure for long periods of time.

(E) In other words, with the lid structure described above, each of the ribs 3 is gradually rotated or swung from a standing state in a falling direction in a process where the lid is slid in an opening direction from the closed state. That is, with this sheet base material 2, because each of the ribs 3 rotates or swings in a separating direction (falling direction) from the sheet base material 2 according to the groove width settings of the guide groove 15, even if the curved groove part 17 is slid and the material is significantly curved and displaced corresponding to a curvature of the curved groove part, a load, or the like applied to the sheet base material 2 near the curved groove part 17 can be minimized. On the other hand, gradually rotating or swinging each of the ribs 3 from a fallen state in a standing direction, through a process where the lid 2 is slid in the closing direction from the open state, will ultimately put the ribs in the standing state, as illustrated in FIG. 5(a). When the lid is closed, each of the ribs 3 will stay as horizontal as possible because the groove width W1 of the linear groove part, and because the rib upper 30 of each of the ribs 3 has the shape of an upwardly convex loose bow, the rib upper abuts the left to right middle part of the sheet base material 2, which is the part thereof most susceptible to bending. As a result, the loose described above and uneven, poor appearance and the like can be kept to a minimum, even in a long period of use.

(Modification 1)

Modification 1 in FIG. 10 illustrates a sheet base material corresponding to FIG. 6(b). Modification 1 reduces the load applied to the sheet base material 2 during curved displacement by making it easier to elastically displace the leg 25, and is thus one example where a hole 28 is added to the thin hinge 25c of the leg 25, which hinge is used to increase displacement. In other words, although the sheet base material 2 is curved and displaced by a process that slides the curved groove part 17, the material is, at that time, curved and displaced by a resistance of the leg 25. When the resistance of the leg 25 is large, a sheet base material surface becomes susceptible to unevenness due to a local load. According to this modification, the leg 25 is designed so that the sheet base material 2 curves and displaces smoothly due to not only the thin hinge 25c, but to the presence of the hole 28 as well.

(Modification 2)

Modification 2 in FIGS. 11(a) and 11(b) illustrates a rib corresponding to FIG. 7(a) and FIG. 9(b). Modification 2 makes it possible for the rib 3 to slide more stably when the guide groove 15 is slid and is thus one example where a guide part 35a is added. In other words, although the rib 3 is slid when the projection 36 fits into the guide groove 15 through the covering part 50 of the rail guide, at that time the rib will abut an outer surface or protruding end surface of the partition wall 18 to thus regulate width direction displacement when the rib lower 35 described above has fitted the projection 36 into the guide groove 15 through the covering part 50 of the rail guide. According to this modification, as further illustrated in FIG. 11(b), the rib lower 35 is provided with the convex part 35a, which abuts a rising surface of the partition wall 18 to regulate a vertical position.

Note that the sliding lid structure may be provided with the configuration specified in the claims, and details thereof can be variously modified or developed with reference to the embodiments and Modifications 1 and 2. For example, although the device main unit 1 has been assumed to be a box, the unit may be a housing for instruments or precision equipment, or a holder for supporting containers, or the like. Although a single configuration of the sheet base material 2 has been given, the material is not limited thereto, and thus development examples thereof may include decorative films or touch panels, or the like, layered on and integrated into an upper surface. Furthermore, the size of the sheet base material and the number of ribs to be used, and the like, can be set appropriately according to the application and material composition. Moreover, the handle 6 is optional, and although the lid was operated manually, a configuration for opening and closing the lid electronically is also acceptable.

Additionally, although the method for molding the sheet base material 2 was a two-color molding method that integrally molds the thin plate 20, the borders 21 and 23, the front end surface wall 22, and the leg 25, the thin plate 20 and the portions other than the thin plate may be formed individually and then integrated using joining means such as welding or bonding, and the like. Moreover, although the axially supported part 26 and the shaft support 34 had concave axially supported parts, and the shaft support 34 was a shaft, as long as these parts are shaped to fit together, the axially supported part may be a shaft, and the shaft support may be changed to a hole or a concave part into which the shaft fits. Although the rail guide is important for ensuring that the lid or sheet base material slides well, the guide can be omitted and each of the projections 36 fitted directly into the guide groove 15.

REFERENCE NUMERALS

1 . . . Device main unit (12 is a side plate)
2 . . . Sheet base material (20 is a thin plate)
3 . . . Rib
4 . . . Sliding lid
5 . . . Rail guide (50 is a covering part, 54 is a linking part)
6 . . . Handle
7 . . . Handle securing member
8 . . . Opening
9A . . . First housing part
9B . . . Second housing part
15 . . . Guide groove (16 is a linear groove part, 17 is a curved groove part)
18 . . . Guide groove partition wall
21 . . . Both side borders of a plate inner surface
22 . . . Front end wall of a plate inner surface
23 . . . Front and rear borders of a plate inner surface
25 . . . Leg (25c is a thin hinge part)
25b . . . Hole for increasing displacement
26 . . . Concave part (axially supported part)
27 . . . Concave part (axially supported part)
28 . . . Hole for increasing displacement
30 . . . Rib upper
34 . . . Shaft (support shaft)
35 . . . Rib lower (35a is a guide)
36 . . . Projection (38 is a locking hole)
50 . . . Covering part (52 is a convex part, 53 is a hook for locking)
54 . . . Linking part (55 is a neck, 56 is a connecting part)

Note that the entire content of the Specification, Claims, Drawings, and Abstract of Japanese Patent Application No. 2018-94901 submitted on May 16, 2018 is cited herein and has been inserted as the disclosure of the Specification according to the present invention.

What is claimed is:

1. A sliding lid structure comprising:
   a sheet base material capable of being curved in a sliding direction; and
   a plurality of ribs disposed on a lower surface side of the sheet base material at intervals in a sheet base material sliding direction, two ends of the rib engaging guide grooves being formed at two sides of an opening of a device main unit and having curved groove parts, and opening and closing the opening by sliding along the guide grooves,
   wherein the sheet base material includes a multiplicity of axially supported parts positioned on two sides of the lower surface side of the base material and provided at predetermined intervals in a longitudinal direction, and
   the rib includes rib uppers arranged inside the axially supported parts on the two sides and attachable to and detachable from a sheet base material lower, shaft supports engaging the axially supported parts, and projections that fit into the guide grooves; and is rotatably or swingably supported with respect to the sheet base material centered on the shaft supports.

2. The sliding lid structure according to claim 1, wherein a groove width of the curved groove part of the guide groove is formed wider than a groove width of a straight linear groove part provided in an opening area of the device main unit.

3. The sliding lid structure according to claim 1, wherein the rib upper is able to apply an upward load on the sheet base material when a lid is closed with the opening being closed by the sheet base material, and is able to release the load when the lid is open with the opening being opened.

4. The sliding lid structure according to claim 1, wherein the rib upper is formed into a shape of an upwardly convex loose bow.

5. The sliding lid structure according to claim 1, wherein the rib includes a rib lower that protrudes relatively lower than the shaft support and regulates a width direction position by slidably abutting against a partition wall that partitions the guide groove in a condition that the projection is fitted into the guide groove.

6. The sliding lid structure according to claim 5, wherein the rib upper and the rib lower are made to protrude in a rotating or swinging direction, respectively, centered on the support shaft of the rib.

7. The sliding lid structure according to claim 1, further comprising rail guides that slidably connect and link the ribs together.

8. The sliding lid structure according to claim 7, wherein the rail guides includes a multiplicity of covering parts mounted on outer circumferences of the projections and linking parts that link the covering parts together.

\* \* \* \* \*